(12) United States Patent
Jo et al.

(10) Patent No.: US 12,492,306 B2
(45) Date of Patent: Dec. 9, 2025

(54) THERMOPLASTIC RESIN COMPOSITION COMPRISING A RECYCLED COPOLYMER AND A RECYCLED RESIN, METHOD OF PREPARING THE RESIN COMPOSITION, AND MOLDED ARTICLE INCLUDING THE RESIN COMPOSITION

(71) Applicant: LG CHEM, LTD., Seoul (KR)

(72) Inventors: Seokhee Jo, Daejeon (KR); Ho Namgung, Daejeon (KR); Junho Choe, Daejeon (KR); Seong Lyong Kim, Daejeon (KR); Dae San Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 419 days.

(21) Appl. No.: 17/917,046

(22) PCT Filed: Aug. 19, 2021

(86) PCT No.: PCT/KR2021/010995
§ 371 (c)(1),
(2) Date: Oct. 5, 2022

(87) PCT Pub. No.: WO2022/075577
PCT Pub. Date: Apr. 14, 2022

(65) Prior Publication Data
US 2023/0145425 A1 May 11, 2023

(30) Foreign Application Priority Data
Oct. 6, 2020 (KR) ........................ 10-2020-0128800

(51) Int. Cl.
*C08L 69/00* (2006.01)
*C08L 25/12* (2006.01)
*C08L 25/16* (2006.01)
*C08L 55/02* (2006.01)

(52) U.S. Cl.
CPC ............ *C08L 55/02* (2013.01); *C08L 25/12* (2013.01); *C08L 25/16* (2013.01); *C08L 69/00* (2013.01); *C08L 2201/08* (2013.01); *C08L 2203/30* (2013.01); *C08L 2205/025* (2013.01); *C08L 2205/035* (2013.01); *C08L 2207/20* (2013.01)

(58) Field of Classification Search
None
See application file for complete search history.

(56) References Cited

U.S. PATENT DOCUMENTS

| 6,114,442 A | 9/2000 | Jung |
| 2003/0134914 A1 | 7/2003 | Inagaki |
| 2004/0138378 A1 | 7/2004 | Takagi |
| 2005/0127579 A1 | 6/2005 | Suzuki |
| 2020/0181400 A1* | 6/2020 | Yamashita ............... C08L 25/12 |
| 2020/0231802 A1 | 7/2020 | Tsukamoto et al. |
| 2021/0024735 A1* | 1/2021 | Park ........................ C08L 25/12 |

FOREIGN PATENT DOCUMENTS

| CN | 1380895 A | 11/2002 |
| CN | 1622873 A | 6/2005 |
| CN | 100374486 C | 3/2008 |
| CN | 106633769 * | 5/2017 |
| CN | 109988373 A | 7/2019 |
| JP | 59-012958 A | 1/1984 |
| JP | H11152387 A | 6/1999 |
| JP | 2007177215 A | 7/2007 |
| JP | 2007-197696 A | 8/2007 |
| JP | 2009-155474 A | 7/2009 |
| JP | 2014-159501 A | 9/2014 |
| JP | 2019-119888 A | 7/2019 |
| JP | 2019137733 A | 8/2019 |
| JP | 6678689 B2 | 4/2020 |
| JP | 2020-111716 A | 7/2020 |
| KR | 10-0382390 B1 | 7/2003 |
| KR | 10-0884222 B1 | 2/2009 |
| KR | 10-2010-0122303 A | 11/2010 |
| KR | 10-2013-0067516 A | 6/2013 |
| KR | 10-2016-0130701 A | 11/2016 |
| KR | 10-2016-0141432 A | 12/2016 |
| KR | 10-2016-0144185 A | 12/2016 |
| KR | 10-1950708 B1 | 2/2019 |
| KR | 10-2019-0082148 A | 7/2019 |

OTHER PUBLICATIONS

Mitsubishi Engineering Plastics Corp; Iupilon S-2000R data sheet (2025). (Year: 2025).*
Budiyantoro; Thermal Characterization of Mixed Virgin Recycle Acrylonitrile Butadiene Styrene; Jurnal Material dans Proses Manufaktur Vool 3 No. 2 (2019) pp. 83-89. (Year: 2019).*
Polimaxx GA300 product data sheet. (Year: 2011).*

* cited by examiner

*Primary Examiner* — David J Buttner
(74) *Attorney, Agent, or Firm* — Morgan, Lewis & Bockius LLP

(57) ABSTRACT

Disclosed is a thermoplastic resin composition, a method of preparing the same, and a molded article including the same. Also disclosed is a thermoplastic resin composition prepared by adding a recycled vinyl cyanide compound-conjugated diene rubber-aromatic vinyl compound copolymer and a recycled polycarbonate resin to a composition including a vinyl cyanide compound-conjugated diene rubber-aromatic vinyl compound graft copolymer, an α-methyl styrene-vinyl cyanide compound-aromatic vinyl compound copolymer, and an aromatic vinyl compound-vinyl cyanide compound copolymer according to a predetermined composition ratio.

20 Claims, 1 Drawing Sheet

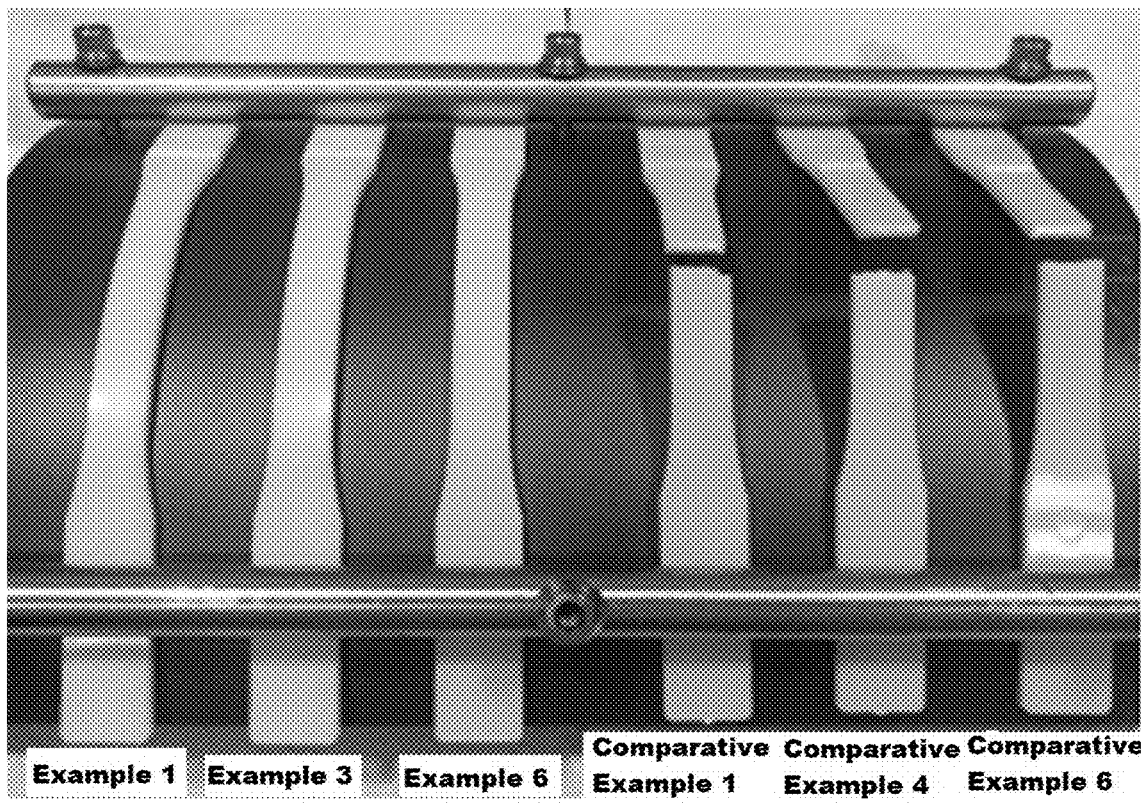

THERMOPLASTIC RESIN COMPOSITION COMPRISING A RECYCLED COPOLYMER AND A RECYCLED RESIN, METHOD OF PREPARING THE RESIN COMPOSITION, AND MOLDED ARTICLE INCLUDING THE RESIN COMPOSITION

CROSS-REFERENCE TO RELATED APPLICATION

This The present application is a U.S. National Stage of PCT/KR2021/010995, filed on Aug. 19, 2021, which claims priority to Korean Patent Application No. 10-2020-0128800, filed on Oct. 6, 2020 in the Korean Intellectual Property Office, the disclosures of each of which are incorporated herein by reference.

TECHNICAL FIELD

The present invention relates to a thermoplastic resin composition, a method of preparing the same, and a molded article including the same. More particularly, the present invention relates to a thermoplastic resin composition prepared by adding a recycled vinyl cyanide compound-conjugated diene rubber-aromatic vinyl compound copolymer and a recycled polycarbonate resin to a composition including a vinyl cyanide compound-conjugated diene rubber-aromatic vinyl compound graft copolymer, an α-methyl styrene-vinyl cyanide compound-aromatic vinyl compound copolymer, and an aromatic vinyl compound-vinyl cyanide compound copolymer according to a specific composition ratio. Due to this compositional feature, the thermoplastic resin composition of the present invention includes a recycled resin while maintaining mechanical properties. In addition, the heat resistance and chemical resistance of the thermoplastic resin composition may be greatly improved.

BACKGROUND ART

Acrylonitrile-butadiene-styrene resins (hereinafter referred to as "ABS resins") based on conjugated diene rubber have excellent processability, mechanical properties, and appearance, and thus have been used in various fields, such as parts of electrical and electronic products, automobiles, small toys, furniture, and building materials.

Meanwhile, as interest in the environment is growing worldwide, regulations are being strengthened to reduce carbon dioxide emissions. In particular, in recent years, environmental pollution due to increased use of plastics has emerged as a serious problem. Accordingly, regulations at a manufacturing stage, such as mandatory use of recycled resins, are being strengthened mainly in the United States. Accordingly, a manufacturer must add more than a certain amount of recycled resin when manufacturing a resin molded product. In addition, an eco-friendly grade is given according to the content of recycled resin.

However, since a recycled resin has already been processed, the recycled resin contains additives such as colorants, lubricants, and release agents, and the like. In addition, the properties of a recycled resin are already changed through high-temperature processing. Thus, as the content of a recycled resin is increased, physical properties are inevitably deteriorated compared to that of an existing resin. In particular, a product including a recycled resin may not have sufficient chemical resistance to organic solvents, detergents, or fragrances used in a post-processing process when manufacturing a molded article, so that cracks or breakage may occur. Due to these problems, it is difficult to commercialize a product including a recycled resin.

RELATED ART DOCUMENTS

Patent Documents

KR 2016-0144185 A

DISCLOSURE

Technical Problem

Therefore, the present invention has been made in view of the above problems, and it is one object of the present invention to provide a thermoplastic resin composition having excellent heat resistance and chemical resistance while maintaining mechanical properties and physical properties, such as moldability, equal to those of a conventional ABS-based resin.

It is another object of the present invention to provide a method of preparing the thermoplastic resin composition and a molded article manufactured using the thermoplastic resin composition.

The above and other objects can be accomplished by the present invention described below.

Technical Solution

In accordance with one aspect of the present invention, provided is a thermoplastic resin composition including 10 to 40% by weight of a vinyl cyanide compound-conjugated diene rubber-aromatic vinyl compound graft copolymer (A), 10 to 40% by weight of an α-methyl styrene-vinyl cyanide compound-aromatic vinyl compound copolymer (B), 5 to 30% by weight of an aromatic vinyl compound-vinyl cyanide compound copolymer (C), 10 to 30% by weight of a recycled vinyl cyanide compound-conjugated diene rubber-aromatic vinyl compound copolymer (D), and 25 to 50% by weight of a recycled polycarbonate resin (E), wherein a weight ratio of the copolymer (B) to the copolymer (C) is 1.3:1 to 3.0:1.

As another example, the present invention provides a thermoplastic resin composition including 10 to 40% by weight of a vinyl cyanide compound-conjugated diene rubber-aromatic vinyl compound graft copolymer (A), 10 to 40% by weight of an α-methyl styrene-vinyl cyanide compound-aromatic vinyl compound copolymer (B), 5 to 30% by weight of an aromatic vinyl compound-vinyl cyanide compound copolymer (C), 10 to 30% by weight of a recycled vinyl cyanide compound-conjugated diene rubber-aromatic vinyl compound copolymer (D), and 25 to 50% by weight of a recycled polycarbonate resin (E), wherein, when a specimen having a size of 200 mm×12.7 mm×3.2 mm is fixed to a curved jig having a strain of 1.1%, 1 cc of thinner is applied thereto, and then time at which cracks occur on a surface of the specimen is measured, the thermoplastic resin composition has a chemical resistance of 600 seconds or more.

In accordance with another aspect of the present invention, provided is a method of preparing a thermoplastic resin composition, the method including a step of kneading and extruding 10 to 40% by weight of a vinyl cyanide compound-conjugated diene rubber-aromatic vinyl compound graft copolymer (A), 10 to 40% by weight of an α-methyl styrene-vinyl cyanide compound-aromatic vinyl compound copolymer (B), 5 to 30% by weight of an aromatic vinyl compound-vinyl cyanide compound copolymer (C), 10 to 30% by weight of a recycled vinyl cyanide compound-conjugated diene rubber-aromatic vinyl compound copolymer (D), and 25 to 50% by weight of a recycled polycarbonate resin (E) at 200 to 280° C., wherein a weight ratio of the copolymer (B) to the copolymer (C) is 1.3:1 to 3.0:1.

As another example, the present invention provides a method of preparing a thermoplastic resin composition, the method including kneading and extruding 10 to 40% by weight of a vinyl cyanide compound-conjugated diene rubber-aromatic vinyl compound graft copolymer (A), 10 to 40% by weight of an α-methyl styrene-vinyl cyanide compound-aromatic vinyl compound copolymer (B), 5 to 30% by weight of an aromatic vinyl compound-vinyl cyanide compound copolymer (C), 10 to 30% by weight of a recycled vinyl cyanide compound-conjugated diene rubber-aromatic vinyl compound copolymer (D), and 25 to 50% by weight of a recycled polycarbonate resin (E) at 200 to 280° C., wherein, when a specimen having a size of 200 mm×12.7 mm×3.2 mm is fixed to a curved jig having a strain of 1.1%, 1 cc of thinner is applied thereto, and then time at which cracks occur on a surface of the specimen is measured, the thermoplastic resin composition has a chemical resistance of 600 seconds or more.

In accordance with yet another aspect of the present invention, provided is a molded article including the thermoplastic resin composition.

Advantageous Effects

By including a recycled vinyl cyanide compound-conjugated diene rubber-aromatic vinyl compound graft copolymer (hereinafter referred to as "ABS-based resin") and a recycled polycarbonate (PC)-based resin in predetermined contents and by adjusting a composition ratio to include an alpha-methylstyrene-vinyl cyanide compound copolymer (heat-resistant SAN-based resin) and a vinyl cyanide compound-aromatic vinyl compound copolymer (SAN-based resin) in a specific weight ratio, the present invention advantageously provides a recycled thermoplastic resin composition having excellent mechanical properties, moldability, heat resistance, and chemical resistance while containing an excess of a recycled resin; a method of preparing the recycled thermoplastic resin composition; and a molded article manufactured using the recycled thermoplastic resin composition.

DESCRIPTION OF DRAWINGS

FIG. 1 shows the chemical resistance test results of Examples according to the present invention and Comparative Examples.

BEST MODE

Hereinafter, the thermoplastic resin composition of the present invention will be described in detail.

The present inventors confirmed that, when a predetermined amount of a recycled PC-based resin was added to a recycled thermoplastic resin composition including a recycled ABS-based resin, and a heat-resistant SAN-based resin and a general SAN-based resin were included in a specific weight ratio, the intrinsic physical properties of the ABS-based resin were maintained and heat resistance and chemical resistance were improved even though an excess of a recycled resin was included. Based on these results, the present inventors conducted further studies to complete the present invention.

The thermoplastic resin composition of the present invention includes 10 to 40% by weight of a vinyl cyanide compound-conjugated diene rubber-aromatic vinyl compound graft copolymer (A), 10 to 40% by weight of an α-methyl styrene-vinyl cyanide compound-aromatic vinyl compound copolymer (B), 5 to 30% by weight of an aromatic vinyl compound-vinyl cyanide compound copolymer (C), 10 to 30% by weight of a recycled vinyl cyanide compound-conjugated diene rubber-aromatic vinyl compound copolymer (D), and 25 to 50% by weight of a recycled polycarbonate resin (E), wherein the weight ratio of the copolymer (B) to the copolymer (C) is 1.3:1 to 3.0:1. In this case, mechanical properties, moldability, heat resistance, and chemical resistance may be excellent while an excess of a recycled resin is included.

As another example, the thermoplastic resin composition of the present invention includes 10 to 40% by weight of a vinyl cyanide compound-conjugated diene rubber-aromatic vinyl compound graft copolymer (A), 10 to 40% by weight of an α-methyl styrene-vinyl cyanide compound-aromatic vinyl compound copolymer (B), 5 to 30% by weight of an aromatic vinyl compound-vinyl cyanide compound copolymer (C), 10 to 30% by weight of a recycled vinyl cyanide compound-conjugated diene rubber-aromatic vinyl compound copolymer (D), and 25 to 50% by weight of a recycled polycarbonate resin (E), wherein, when a specimen having a size of 200 mm×12.7 mm×3.2 mm is fixed to a curved jig having a strain of 1.1%, 1 cc of thinner is applied thereto, and then at a time at which cracks occur on the surface of the specimen is measured, the thermoplastic resin composition has a chemical resistance of 600 seconds or more. In this case, mechanical properties, moldability, heat resistance, and chemical resistance may be excellent while an excess of a recycled resin is included.

In this description, the composition ratio of a (co)polymer may mean the content of units constituting the (co)polymer, or may mean the content of units input during polymerization of the (co)polymer.

Hereinafter, each component constituting the thermoplastic resin composition of the present invention will be described in detail.

(A) Vinyl Cyanide Compound-Conjugated Diene Rubber-Aromatic Vinyl Compound Graft Copolymer The vinyl cyanide compound-conjugated diene rubber-aromatic vinyl compound graft copolymer (A) (hereinafter referred to as "graft copolymer (A)") is included in the thermoplastic resin composition in an amount of 10 to 40% by weight. In this case, mechanical properties, moldability, and appearance may be excellent. As a preferred example, based on a total weight of the composition, the graft copolymer (A) may be included in an amount of 15 to 40% by weight, more preferably 17 to 35% by weight. Within this range, mechanical properties, moldability, appearance, and physical property balance may be excellent.

For example, the graft copolymer (A) may include 50 to 80% by weight of conjugated diene rubber comprising a conjugated diene compound, 5 to 20% by weight of a vinyl cyanide compound, and 10 to 40% by weight of an aromatic vinyl compound. In this case, mechanical properties, moldability, appearance, and physical property balance may be excellent.

As a preferred example, the graft copolymer (A) may include 50 to 70% by weight of conjugated diene rubber, 5 to 15% by weight of a vinyl cyanide compound, and 20 to 40% by weight of an aromatic vinyl compound, more preferably 55 to 65% by weight of conjugated diene rubber, 10 to 15% by weight of a vinyl cyanide compound, and 20 to 30% by weight of an aromatic vinyl compound. Within this range, impact resistance and physical property balance may be excellent.

For example, an average particle diameter of the conjugated diene rubber included in the graft copolymer (A) may be 2,000 to 5,000 Å, preferably 2,000 to 4,000 Å, more preferably 2,500 to 3,500 Å. Within this range, impact strength may be excellent without deterioration in other physical properties.

In this description, average particle diameter of the conjugated diene rubber may be measured by dynamic light scattering, and specifically, may be measured as an intensity value using a Nicomp 380 particle size analyzer (manufacturer: PSS) in a Gaussian mode.

For example, the graft copolymer (A) may have a grafting degree of 20 to 70%, preferably 20 to 55%, more preferably 20 to 45% Within this range, appropriate compatibility and moldability may be secured, and balance between compatibility, moldability, and other mechanical properties may be excellent.

In this description, to measure grafting degree, graft (co)polymer latex is coagulated, washed, and dried to obtain powder, and then 1 g of the obtained powder is added to 30 ml of acetone, followed by stirring for 24 hours. Then, the stirred solution is centrifuged at 14,000 rpm for 4 hours using an ultracentrifuge to obtain insoluble matter, and the insoluble matter is dried at 85° C. for 4 hours. Then, the weight of the dried insoluble matter is measured, and grafting degree is calculated by substituting the measured value into Equation 1 below.

Grafting degree (%)=[{Weight (g) of dried insoluble matter−weight (g) of rubber added during graft polymerization}/weight (g) of rubber added during graft polymerization]×100     [Equation 1]

The drying may proceed until there is no further change in weight.

For example, the graft copolymer (A) may have a weight average molecular weight of 500,000 to 1,000,000 g/mol, preferably 650,000 to 900,000 g/mol. Within this range, due to proper fluidity, excellent processability and impact resistance may be secured.

In this description, weight average molecular weight may be measured at 40° C. using tetrahydrofuran (THF) as a solvent using a gel permeation chromatograph (GPC) filled with porous silica as a column packing material. In this case, weight average molecular weight is obtained as a relative value to a polystyrene (PS) standard sample.

For example, the graft copolymer (A) may be prepared by a known polymerization method including emulsion polymerization, suspension polymerization, bulk polymerization, and the like, preferably emulsion polymerization.

For example, based on 100 parts by weight in total of the conjugated diene rubber, the aromatic vinyl compound, and the vinyl cyanide compound included in the graft copolymer, the graft copolymer (A) may be prepared by adding, continuously or batchwise, a monomer mixture including 5 to 20 parts by weight of the vinyl cyanide compound and 10 to 40 parts by weight of the aromatic vinyl compound to a mixed solution containing 50 to 80 parts by weight (based on solids) of conjugated diene rubber latex, 0.1 to 5 parts by weight of an emulsifier, 0.1 to 3 parts by weight of a molecular weight modifier, and 0.05 to 1 part by weight of an initiator and then performing polymerization.

As another example, based on 100 parts by weight in total of the conjugated diene rubber, the aromatic vinyl compound, and the vinyl cyanide compound, the graft copolymer (A) may be prepared by adding, at 65 to 75° C. for 2 to 4 hours, a mixed solution including 5 to 20 parts by weight of the vinyl cyanide compound, 10 to 40 parts by weight of the aromatic vinyl compound, 10 to 50 parts by weight of deionized water, 0.09 to 1.5 parts by weight of an initiator, 0.1 to 2 parts by weight of an emulsifier, and 0.05 to 1.5 parts by weight of a molecular weight modifier, which has been mixed in a separate mixing device, to 50 to 80 parts by weight (based on solids) of conjugated diene rubber latex and 60 to 150 parts by weight of deionized water; adding 0.01 to 0.5 parts by weight of an initiator thereto; raising temperature to 75 to 80° C. for 30 to 90 minutes; and terminating graft polymerization at a polymerization conversion rate of 93 to 99% by weight. In this case, impact resistance, mechanical strength, and moldability may be excellent.

In this description, based on 100% of the total weight of monomers input until polymerization is completed, polymerization conversion rate may be defined as % by weight of the monomers converted into a polymer until measurement time. A method of measuring polymerization conversion rate is not particularly limited as long as the method follows this definition. As a specific example, after drying 1.5 g of prepared (co)polymer latex in a hot air dryer at 150° C. for 15 minutes, the weight of the dried latex is measured, and total solids content (TSC) is calculated by Equation 2 below. Then, polymerization conversion rate is calculated by substituting the total solids content value into Equation 3 below. In Equation 3, the total weight of added monomers is given as 100 parts by weight.

Total solids content (TSC; %)=(Weight after drying/ Weight before drying)×100     [Equation 2]

Polymerization conversion rate (%)=[Total solids content (TSC)×(Total weight of added monomers, deionized water, and subsidiary raw materials)/100]−(Weight of added subsidiary raw materials other than monomers and deionized water)     [Equation 3]

In Equation 3, subsidiary raw materials include an initiator, an emulsifier, and a molecular weight modifier, and include an electrolyte when the electrolyte is used.

For example, the conjugated diene compound may include one or more selected from the group consisting of 1,3-butadiene, 2,3-dimethyl-1,3-butadiene, 2-ethyl-1,3-butadiene, 1,3-pentadiene, isoprene, and chloroprene.

For example, the vinyl cyanide compound may include one or more selected from the group consisting of acrylonitrile, methacrylonitrile, ethylacrylonitrile, and isopropylacrylonitrile, preferably acrylonitrile.

For example, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably one or more selected from the group consisting of styrene and α-methyl styrene, more preferably styrene. In this case, due to proper fluidity, processability and mechanical properties, such as impact resistance, may be excellent.

In this description, the derivative is a compound produced by substituting a hydrogen atom or an atomic group of an original compound with another atom or atomic group, for example, refers to a compound produced by substitution with a halogen or an alkyl group.

For example, the emulsifier may include one or more selected from the group consisting of allyl aryl sulfonates, alkali methyl alkyl sulfonates, sulfonated alkyl esters, fatty acid soap, and rosin acid alkali salts. In this case, polymerization stability may be excellent.

For example, the molecular weight modifier may include one or more selected from the group consisting of t-dodecyl mercaptan, n-dodecyl mercaptan, n-octyl mercaptan, and carbon tetrachloride, preferably t-dodecyl mercaptan.

For example, the initiator may be a water-soluble persulfuric acid polymerization initiator, a fat-soluble polymerization initiator, or an oxidation-reduction catalyst system. For example, the water-soluble persulfuric acid polymerization initiator may include one or more selected from the group consisting of potassium persulfate, sodium persulfate, and ammonium persulfate, and the fat-soluble polymerization initiator may include one or more selected from the group consisting of cumene hydroperoxide, diisopropyl benzene hydroperoxide, azobis iso butyronitrile, t-butyl hydroperoxide, paramenthane hydroperoxide, and benzoylperoxide.

For example, latex prepared by emulsion polymerization may be coagulated using a coagulant such as sulfuric acid, $MgSO_4$, $CaCl_2$, or $Al_2(SO_4)_3$, and then the coagulated latex may be aged, dehydrated, and dried to obtain powdered latex.

For example, when the graft copolymer (A) is prepared, an oxidation-reduction catalyst may be further included. For example, the oxidation-reduction catalyst may include one or more selected from the group consisting of sodium formaldehyde sulfoxylate, sodium ethylenediamine tetraacetate, ferrous sulfate, dextrose, sodium pyrophosphate, and sodium sulfite, without being limited thereto. Oxidation-reduction catalysts commonly used when ABS-based graft copolymers are prepared may be used in the present invention, without particular limitation.

Other additives such as electrolytes and the like not specifically mentioned in the present description may be appropriately selected when necessary. The additives may be used within a range commonly applied in the preparation of vinyl cyanide compound-conjugated diene rubber-aromatic vinyl compound graft copolymer latex, without particular limitation.

In the method of preparing the graft copolymer, other reaction conditions, such as reaction time, reaction temperature, pressure, and time of input of reactants, other than the above-mentioned conditions, may be appropriately selected and used without particular limitation as long as the other reaction conditions are commonly used in the art to which the present invention pertains.

(B) α-Methyl Styrene-Vinyl Cyanide Compound-Aromatic Vinyl Compound Copolymer

Based on a total weight of the thermoplastic resin composition, the α-methyl styrene-vinyl cyanide compound-aromatic vinyl compound copolymer (B) (hereinafter referred to as "copolymer (B)") is included in an amount of 10 to 40% by weight. In this case, heat resistance and mechanical properties may be excellent. As a preferred example, based on 100% by weight in total of the thermoplastic resin composition, the copolymer (B) may be included in an amount of 10 to 35% by weight, more preferably 15 to 35% by weight. Within this range, heat resistance may be excellent without deterioration of appearance.

For example, the copolymer (B) may include 50 to 80% by weight of α-methyl styrene, 10 to 30% by weight of a vinyl cyanide compound, and 5 to 25% by weight of an aromatic vinyl compound excluding α-methyl styrene, preferably 50 to 75% by weight of α-methyl styrene, 15 to 30% by weight of a vinyl cyanide compound, and 5 to 25% by weight of an aromatic vinyl compound excluding α-methyl styrene, more preferably 55 to 75% by weight of α-methyl styrene, 15 to 25% by weight of a vinyl cyanide compound, and 5 to 20% by weight of an aromatic vinyl compound excluding α-methyl styrene. Within this range, heat resistance may be excellent without deterioration in other physical properties.

For example, the copolymer (B) may have a weight average molecular weight of 80,000 to 200,000 g/mol, preferably 80,000 to 150,000 g/mol. Within this range, a desired effect may be sufficiently obtained.

For example, the copolymer (B) may have a glass transition temperature (Tg) of 100 to 140° C., preferably 110 to 130° C. Within this range, heat resistance may be excellent without deterioration in other physical properties.

In this description, glass transition temperature (Tg) may be measured at a temperature increase rate of 10° C./min using a Pyris 6 DSC (Perkin Elmer Co.).

Preparation methods commonly used in the art to which the present invention pertains may be used as a method of preparing the copolymer (B), without particular limitation. As specific example, the method of preparing the copolymer (B) may include a step of adding 0.05 to 0.5 parts by weight of a polyfunctional initiator to 100 parts by weight of a monomer mixture containing 50 to 80% by weight of α-methyl styrene, 10 to 30% by weight of a vinyl cyanide compound, and 5 to 25% by weight of an aromatic vinyl compound excluding α-methyl styrene and performing polymerization. In this case, polymerization may be suspension polymerization, emulsion polymerization, solution polymerization, or bulk polymerization, preferably bulk polymerization. In this case, heat resistance and fluidity may be excellent.

Commercially available products may be used as the copolymer (B) as long as the commercially available products follow the definition of the present invention.

(C) Aromatic Vinyl Compound-Vinyl Cyanide Compound Copolymer

Based on a total weight of the thermoplastic resin composition, the aromatic vinyl compound-vinyl cyanide compound copolymer (C) (hereinafter referred to as "copolymer (C)") is included in an amount of 5 to 30% by weight. In this case, mechanical properties, moldability, and appearance may be excellent. As a preferred example, based on 100% by weight in total of the thermoplastic resin composition, the copolymer (C) may be included in an amount of 5 to 25% by weight, more preferably 5 to 20% by weight. Within this range, chemical resistance, mechanical properties, moldability, appearance, and physical property balance may be excellent.

For example, the copolymer (C) may include 20 to 40% by weight of a vinyl cyanide compound and 60 to 80% by weight of an aromatic vinyl compound excluding α-methyl styrene, preferably 20 to 35% by weight of a vinyl cyanide compound and 65 to 80% by weight of an aromatic vinyl compound, more preferably 23 to 33% by weight of a vinyl cyanide compound and 67 to 77% by weight of an aromatic vinyl compound. Within this range, due to proper fluidity, moldability may be excellent.

For example, the aromatic vinyl compound included in the copolymer (C) may include one or more selected from the group consisting of styrene, ethyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

For example, the copolymer (C) may further include 0 to 30% by weight, preferably 1 to 20% by weight, more preferably 5 to 10% by weight of one or more selected from the group consisting of an unsaturated carboxylic acid, an anhydride of an unsaturated carboxylic acid, and a maleimide-based monomer. As such, when a comonomer is included when a copolymer is polymerized, heat resistance and processability may be excellent.

For example, the unsaturated carboxylic acid may include one or more selected from the group consisting of maleic acid, acrylic acid, and methacrylic acid, the anhydride of an unsaturated carboxylic acid may be an anhydride of the unsaturated carboxylic acid, and the maleimide-based monomer may be maleimide N-substituted with an alkyl group having 1 to 5 carbon atoms or an aryl group having 6 to 10 carbon atoms, as a specific example, N-phenyl maleimide, maleimide, or a mixture thereof.

For example, the copolymer (C) may have a weight average molecular weight of 70,000 to 200,000 g/mol, preferably 80,000 to 180,000 g/mol, more preferably 90,000 to 160,000 g/mol. Within this range, chemical resistance, processability, and physical property balance may be excellent.

The aromatic vinyl compound-vinyl cyanide compound copolymer (C) may be prepared by emulsion polymerization, suspension polymerization, bulk polymerization, or continuous bulk polymerization, preferably emulsion polymerization or suspension polymerization.

Commercially available products may be used as the copolymer (C) as long as the commercially available products follow the definition of the present invention.

(D) Recycled Vinyl Cyanide Compound-Conjugated Diene Rubber-Aromatic Vinyl Compound Copolymer Based on a total weight of the thermoplastic resin composition, the recycled vinyl cyanide compound-conjugated diene rubber-aromatic vinyl compound copolymer (D) (hereinafter referred to as "copolymer (D)") is included in an amount of 10 to 30% by weight. In this case, since a recycled resin is contained in a certain amount or more, eco-friendliness and economic efficiency may be improved, and mechanical properties, moldability, and appearance may be excellent. As a preferred example, based on 100% by weight in total of the thermoplastic resin composition, the copolymer (D) may be included in an amount of 10 to 25% by weight, more preferably 10 to 20% by weight. Within this range, chemical resistance, mechanical properties, moldability, and appearance may be excellent.

For example, the copolymer (D) may be obtained from automobile interior parts, office supplies, home appliances, and the like.

In this description, a recycled resin that is generally recognized as a recycled resin in the technical field to which the present invention pertains and conforms to the definition of the present invention may be used in the present invention without particular limitation. For example, a recycled resin may be a raw material obtained by screening, washing, and pulverizing collected waste plastics. When necessary, a recycled resin obtained in the form of pellets through an extrusion process may be used. In this case, there is an advantage that no additional processing such as additional purification is required.

For example, the copolymer (D) may be a graft copolymer. In this case, chemical resistance may be excellent.

For example, the copolymer (D) may have a glass transition temperature of 80 to 150° C., preferably 90 to 150° C., more preferably 100 to 140° C. Within this range, physical property balance between mechanical properties and moldability may be excellent.

For example, the copolymer (D) may have a melt index of 10 g/10 min or more, preferably 10 to 30 g/10 min, more preferably 15 to 25 g/10 min as measured at 220° C. under a load of 10 kg according to ASTM D1238. Within this range, compatibility, moldability, and physical property balance may be excellent.

For example, the copolymer (D) may have an Izod impact strength of 10 kg·cm/cm or more, preferably 10 to 20 kg·cm/cm as measured under ⅛" thickness conditions according to ASTM D256. Within this range, mechanical properties may be excellent without deterioration in other physical properties.

For example, units constituting the copolymer (D) may be selected within the same range as described in the graft copolymer (A).

(E) Recycled Polycarbonate Resin

Based on a total weight of the thermoplastic resin composition, the recycled polycarbonate resin (E) (hereinafter referred to as "resin (E)") is included in an amount of 25 to 50% by weight. In this case, since a recycled resin is contained in a certain amount or more, eco-friendliness and economic efficiency may be improved, and mechanical properties, moldability, and appearance may be excellent. As a preferred example, based on 100% by weight in total of the thermoplastic resin composition, the resin (E) may be included in an amount of 25 to 45% by weight, more preferably 30 to 40% by weight. Within this range, chemical resistance, mechanical properties, moldability, and appearance may be excellent.

For example, the resin (E) may be obtained from automobile interior parts, office supplies, home appliances, and the like.

In this description, a recycled resin that is generally recognized as a recycled resin in the technical field to which the present invention pertains and conforms to the definition of the present invention may be used in the present invention without particular limitation. For example, a recycled resin may be a raw material obtained by screening, washing, and pulverizing collected waste plastics. When necessary, a recycled resin obtained in the form of pellets through an extrusion process may be used. In this case, there is an advantage that no additional processing such as additional purification is required.

The type of the resin (E) is not particularly limited. For example, the resin (E) may be a resin obtained by polymerizing a bisphenol-based monomer and a carbonate precursor.

For example, the bisphenol-based monomer may include one or more selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A; BPA), 2,2-bis(4-hydroxyphenyl)butane, 1,1-bis(4-hydroxyphenyl)cyclohexane (bisphenol Z; BPZ), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

For example, the carbonate precursor may include one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, bis(diphenyl) carbonate, carbonyl chloride (phosgene), triphosgene, diphosgene, carbonyl bromide, and bishaloformate.

For example, the resin (E) may include one or more selected from the group consisting of a linear polycarbonate resin, a branched polycarbonate resin, and a polyester carbonate copolymer resin, preferably a linear polycarbonate resin. In this case, fluidity may be improved, and thus appearance may be excellent.

As a specific example, the linear polycarbonate resin may be a bisphenol A-based polycarbonate resin, without being limited thereto.

For example, the resin (E) may have a weight average molecular weight of 15,000 to 40,000 g/mol, preferably 20,000 to 35,000 g/mol. Within this range, mechanical properties, such as impact strength, and appearance may be excellent.

For example, the resin (E) may have a melt index of 10 g/10 min or more, preferably 10 to 30 g/10 min, more preferably 15 to 25 g/10 min as measured at 300° C. under a load of 1.2 kg according to ASTM D1238. Within this range, compatibility, moldability, and physical property balance may be excellent.

For example, the resin (E) may have an Izod impact strength of 60 kg·cm/cm or more, preferably 60 to 85 kg·cm/cm as measured under ⅛" thickness conditions according to ASTM D256. Within this range, mechanical properties may be excellent without deterioration in other physical properties.

Thermoplastic Resin Composition

The thermoplastic resin composition of the present invention includes 10 to 40% by weight of a vinyl cyanide compound-conjugated diene rubber-aromatic vinyl compound graft copolymer (A), 10 to 40% by weight of an α-methyl styrene-vinyl cyanide compound-aromatic vinyl compound copolymer (B), 5 to 30% by weight of an aromatic vinyl compound-vinyl cyanide compound copolymer (C), 10 to 30% by weight of a recycled vinyl cyanide compound-conjugated diene rubber-aromatic vinyl compound copolymer (D), and 25 to 50% by weight of a recycled polycarbonate resin (E). In this case, heat resistance and chemical resistance may be excellent while maintaining mechanical properties and physical properties, such as moldability, equal to those of a conventional ABS-based resin.

In the thermoplastic resin composition of the present invention, the weight ratio of the copolymer (B) to the copolymer (C) is 1.3:1 to 3.0:1, preferably 1.5:1 to 2.5:1, more preferably 1.7:1 to 2.2:1. Within this range, heat resistance and mechanical properties may be excellent.

For example, when the thermoplastic resin composition is prepared according to the specific composition ratio, when a specimen having a size of 200 mm×12.7 mm×3.2 mm is fixed to a curved jig having a strain of 1.1%, 1 cc of thinner is applied thereto, and then time at which cracks occur on the surface of the specimen is measured, the thermoplastic resin composition has a chemical resistance of 600 seconds or more, showing excellent chemical resistance (environmental stress-cracking resistance, ESCR). For example, when chemical resistance meets the range, occurrence of cracks due to organic solvents and detergents used in post-processing processes such as painting and deposition may be prevented. As another example, when the thermoplastic resin composition is used as a vehicle air vent component, occurrence of cracks due to a vehicle air freshener may be prevented. Accordingly, the thermoplastic resin composition may be appliable to various fields, and may prevent deterioration of a product therefrom while in use.

For example, in the thermoplastic resin composition, based on a total weight of the thermoplastic resin composition, a sum of the weight of the copolymer (D) and the weight of the resin (E) may be 50% by weight or more. In this case, despite the high content (50% by weight or more) of a recycled resin, heat resistance and chemical resistance may be excellent while maintaining the intrinsic physical properties of a conventional ABS-based resin.

For example, the thermoplastic resin composition may have a heat deflection temperature (HDT) of 100° C. or higher, preferably 100 to 120° C., more preferably 100 to 110° C. as measured according to ASTM D648-7. Within this range, heat resistance may be excellent without deterioration in other physical properties. In addition, for example, when the thermoplastic resin composition is used as an interior material for a vehicle, even when the temperature inside a vehicle rises above 50° C. in summer, deterioration of a product may be prevented.

For example, the thermoplastic resin composition may have a melt index of 8.0 g/10 min or more, preferably 8.0 to 20 g/10 min, more preferably 8.0 to 15 g/10 min as measured at 220° C. under a load of 10 kg according to ASTM D1238. Within this range, moldability and appearance may be excellent without deterioration in other physical properties.

For example, the thermoplastic resin composition may have an Izod impact strength of 40 kgf·cm/cm or more, preferably 40 to 70 kgf·cm/cm, more preferably 40 to 65 kgf·cm/cm as measured using a specimen having a thickness of ⅛" according to ASTM D256. Within this range, mechanical strength may be excellent without deterioration in other physical properties.

Method of Preparing Thermoplastic Resin Composition

The thermoplastic resin composition of the present invention may be prepared by a method including a step of kneading and extruding 10 to 40% by weight of a vinyl cyanide compound-conjugated diene rubber-aromatic vinyl compound graft copolymer (A), 10 to 40% by weight of an α-methyl styrene-vinyl cyanide compound-aromatic vinyl compound copolymer (B), 5 to 30% by weight of an aromatic vinyl compound-vinyl cyanide compound copolymer (C), 10 to 30% by weight of a recycled vinyl cyanide compound-conjugated diene rubber-aromatic vinyl compound copolymer (D), and 25 to 50% by weight of a recycled polycarbonate resin (E) at 200 to 280° C. In this case, even when an excess of a recycled resin is included, heat resistance and chemical resistance may be excellent while maintaining the intrinsic physical properties of a conventional ABS-based resin.

When a specimen having a size of 200 mm×12.7 mm×3.2 mm is fixed to a curved jig having a strain of 1.1%, 1 cc of thinner is applied thereto, and then time at which cracks occur on the surface of the specimen is measured, the thermoplastic resin composition prepared by the method has a chemical resistance of 600 seconds or more, showing excellent chemical resistance.

For example, the kneading and extrusion step may be performed at a temperature of 200 to 280° C. and a screw rotation speed of an extruder of 500 to 700 rpm, preferably at a temperature of 220 to 260° C. and a screw rotation speed of an extruder of 550 to 650 rpm. In this case, mechanical properties, chemical resistance, heat resistance, and appearance may be excellent.

For example, the kneading and extrusion step may be performed using one or more selected from a single-screw extruder, a twin-screw extruder, and a Banbury mixer. The kneading and extrusion step may be performed by uniformly mixing components using the single-screw extruder, the twin-screw extruder, or the Banbury mixer and performing extrusion to obtain a thermoplastic resin composition in pellet form. In this case, deterioration of mechanical properties and heat resistance may be prevented, and appearance may be excellent.

When necessary, in the kneading and extrusion step, the thermoplastic resin composition may further include one or more additives selected from the group consisting of a lubricant, a heat stabilizer, a light stabilizer, an antioxidant, a UV stabilizer, a dye, a pigment, a colorant, a release agent, an antistatic agent, an antibacterial agent, a processing aid, a compatibilizer, a metal deactivator, a flame retardant, a smoke suppressant, an anti-drip agent, a foaming agent, a plasticizer, a reinforcing agent, a filler, a matte agent, an anti-friction agent, and an anti-wear agent. Based on 100 parts by weight in sum of the graft copolymer (A), the copolymer (B), the copolymer (C), the copolymer (D), and the resin (E), the additives may be included in an amount of 0.01 to 5 parts by weight, preferably 0.05 to 3 parts by weight, 0.05 to 2 parts by weight, or 0.05 to 1 part by weight. Within this range, required physical properties may be efficiently expressed without deterioration in the intrinsic physical properties of the thermoplastic resin composition.

For example, the lubricant may include one or more selected from ethylene bis stearamide, oxidized polyethylene wax, magnesium stearate, calcium stearate, stearic acid, and silicone oil, without being limited thereto.

For example, the silicone oil may include one or more selected from the group consisting of dimethyl silicone oil, methyl hydrogen silicone oil, ester-modified silicone oil, hydroxy silicone oil, carbinol-modified silicone oil, vinyl silicone oil, and silicone acrylate.

For example, as the antioxidant, phenolic antioxidants, phosphorus antioxidants, and the like may be used, without being limited thereto.

For example, as the antistatic agent, one or more selected from anionic surfactants and nonionic surfactants may be used, without being limited thereto.

For example, as the release agent, one or more selected from glycerin stearate and polyethylene tetrastearate may be used, without being limited thereto.

Molded Article

The molded article of the present invention includes the thermoplastic resin composition of the present invention. In this case, even though a recycled resin is included, mechanical properties, moldability, appearance, heat resistance, and chemical resistance may be excellent.

Due to excellent mechanical strength, heat resistance, and chemical resistance, the molded article may be applied to vehicle air vents, rear lamps, painted products, and the like.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows.
(A) Vinyl cyanide compound-conjugated diene rubber-aromatic vinyl compound graft copolymer: ABS graft copolymer (DP270, LG Chemical Co.) including 60% by weight of butadiene rubber having an average particle diameter of 3,200 Å, 10% by weight of acrylonitrile, and 30% by weight of styrene
(B) α-Methyl styrene-vinyl cyanide compound-aromatic vinyl compound copolymer: Heat-resistant AMS-SAN resin (weight average molecular weight: 95,000 g/mol, 99UH, LG Chemical Co.) prepared by copolymerizing 66% by weight of α-methyl styrene, 28% by weight of acrylonitrile, and 6% by weight of styrene
(C) Aromatic vinyl compound-vinyl cyanide compound copolymer: SAN resin (weight average molecular weight: 130,000 g/mol, 92RF, LG Chemical Co.) prepared by copolymerizing 28% by weight of acrylonitrile and 72% by weight of styrene
(D) Recycled vinyl cyanide compound-conjugated diene rubber-aromatic vinyl compound: Recycled ABS resin (ABS BK, CNTECH KOREA Co.) having a Tg of 90° C. and having a melt index of 15 g/10 min as measured under conditions of 220° C. and 10 kg according to ASTM D1238
(E) Recycled polycarbonate resin: Bisphenol A-type recycled polycarbonate resin (20HT, EASYCHEM Co.) having a weight average molecular weight of 25,000 g/mol and having a melt index of 18 g/10 min as measured under conditions of 300° C. and 1.2 kg according to ASTM D1238
(F) Antioxidant: Primary antioxidant (Wingstay-L, ELIOKEM Co.)
(G) Lubricant: Oxidized polyethylene wax lubricant (PETS-AHS, FACI Co.)

Examples 1 to 6 and Comparative Examples 1 to 9

According to the contents shown in Table 1 below, the graft copolymer (A), the copolymer (B), the copolymer (C), the copolymer (D), the resin (E), the antioxidant (F), and the lubricant (G) were mixed using a super mixer, and then the mixture was extruded at an extrusion temperature of 240° C. and a screw rotation rate of 600 rpm using a twin-screw extruder (screw diameter: 26 mm, L/D=40) to obtain pellets.

The prepared thermoplastic resin composition in pellet form was dried at 80° C. for 4 hours or more, and then was injection-molded at an injection temperature of 240° C., a mold temperature of 60° C., and an injection rate of 30 mm/sec using an injection machine to obtain a specimen. The specimen was allowed to stand at room temperature (20 to 26° C.) for 48 hours or more, and then the physical properties thereof were measured.

Test Examples

The physical properties of the specimens prepared in Examples and Comparative Examples were measured according to the following methods, and the results are shown in Table 2 below.

Izod impact strength (kgf·cm/cm): Izod impact strength was measured using a specimen having a thickness of ⅛" according to ASTM D256.

Melt flow index (g/10 min): Melt flow index was measured at 220° C. under a load of 10 kg for 10 minutes according to ASTM D1238.

Heat deflection temperature (° C.): Heat deflection temperature was measured under a load of 18.6 kgf/cm² using a specimen having a thickness of ¼" according to ASTM D648-7.

Chemical resistance: Through injection, a specimen having a size of 200 mm×12.7 mm×3.2 mm was prepared. The specimen was fixed to a curved jig having a strain of 1.1% and 1 cc of thinner (T803, NOROOBEE Chemical Co.) was applied thereto. Then, occurrence of cracks on the surface of the specimen was observed by the naked eye, and time at which cracks occurred was measured. Based on 600 seconds, when time at which cracks occurred was 600 seconds or more, it was marked as "O", and when time at which cracks occurred was less than 600 seconds, it was marked as "X".

TABLE 1

| Classification | (A) g-ABS | (B) AMS-SAN | (C) SAN | (D) Recycled ABS | (E) Recycled PC | (F) Antioxidant | (E) Lubricant |
|---|---|---|---|---|---|---|---|
| Example 1 | 20 | 20 | 10 | 20 | 30 | 0.2 | 0.5 |
| Example 2 | 20 | 20 | 10 | 15 | 35 | 0.2 | 0.5 |
| Example 3 | 20 | 20 | 10 | 10 | 40 | 0.2 | 0.5 |
| Example 4 | 20 | 15 | 5 | 20 | 40 | 0.2 | 0.5 |
| Example 5 | 20 | 18 | 12 | 20 | 30 | 0.2 | 0.5 |
| Example 6 | 20 | 22 | 8 | 20 | 30 | 0.2 | 0.5 |
| Comparative Example 1 | 20 | 50 | 30 | — | — | 0.2 | 0.5 |
| Comparative Example 2 | 20 | 30 | 30 | 20 | — | 0.2 | 0.5 |
| Comparative Example 3 | 20 | 20 | 10 | 50 | — | 0.2 | 0.5 |
| Comparative Example 4 | 20 | 30 | 30 | — | 20 | 0.2 | 0.5 |
| Comparative Example 5 | 20 | 30 | 20 | — | 30 | 0.2 | 0.5 |
| Comparative Example 6 | 20 | 20 | 10 | — | 50 | 0.2 | 0.5 |
| Comparative Example 7 | 20 | 20 | 10 | 30 | 20 | 0.2 | 0.5 |
| Comparative Example 8 | 20 | 10 | 20 | 20 | 30 | 0.2 | 0.5 |
| Comparative Example 9 | 20 | 25 | 5 | 20 | 30 | 0.2 | 0.5 |

TABLE 2

| Classification | Izod impact strength kgf·cm/cm | Melt index (MI) g/10 min | Heat deflection temperature (HDT) ° C. | Chemical resistance (ESCR) >600 s |
|---|---|---|---|---|
| Example 1 | 48.4 | 9.1 | 100.6 | O |
| Example 2 | 54.8 | 8.8 | 101.9 | O |
| Example 3 | 60.1 | 8.4 | 103.5 | O |
| Example 4 | 61.2 | 8.7 | 102.6 | O |
| Example 5 | 48.1 | 9.3 | 100.3 | O |
| Example 6 | 48.5 | 8.9 | 101.2 | O |
| Comparative Example 1 | 30.4 | 8.6 | 96.7 | X |
| Comparative Example 2 | 32.8 | 9.3 | 94.6 | O |
| Comparative Example 3 | 35.3 | 10.1 | 91.0 | O |
| Comparative Example 4 | 35.4 | 8.4 | 100.1 | X |
| Comparative Example 5 | 46.4 | 8.3 | 101.7 | X |
| Comparative Example 6 | 62.5 | 8.0 | 103.6 | X |
| Comparative Example 7 | 36.7 | 8.9 | 96.9 | O |
| Comparative Example 8 | 46.8 | 10.5 | 99.1 | O |
| Comparative Example 9 | 48.5 | 7.6 | 101.2 | O |

As shown in Tables 1 and 2, compared to Comparative Examples 1 to 9 outside the range of the present invention, in the case of Examples 1 to 6 according to the present invention, impact strength, melt index, heat resistance, and chemical resistance are excellent.

In particular, in the case of Comparative Examples 8 and 9, the content of each component is within the range of the present invention, but the weight ratio of the copolymer (B) to the copolymer (C) is outside the range of the present invention. Thus, mechanical strength and heat resistance are reduced, or fluidity is reduced to less than 8 g/10 min. In addition, in the case of Comparative Example 9 in which fluidity is less than 8 g/10 min, heat deflection occurs during a molding process, or problems such as poor coating or surface defects occur.

FIG. 1 shows the chemical resistance test results of Examples according to the present invention and Comparative Examples. Referring to FIG. 1, in the case of Examples 1, 3, and 6 according to the present invention, no cracks occur even after 600 seconds after applying a thinner. On the other hand, in the case of Comparative Examples 1, 4, and 6, the specimens are broken. These results show that Examples according to the present invention exhibit significantly improved chemical resistance.

The invention claimed is:

1. A thermoplastic resin composition, comprising:
   10 to 40% by weight of a vinyl cyanide compound-conjugated diene rubber-aromatic vinyl compound graft copolymer (A);
   10 to 40% by weight of an α-methyl styrene-vinyl cyanide compound-aromatic vinyl compound copolymer (B);
   5 to 30% by weight of an aromatic vinyl compound-vinyl cyanide compound copolymer (C);
   10 to 30% by weight of a recycled vinyl cyanide compound-conjugated diene rubber-aromatic vinyl compound copolymer (D), wherein the copolymer (D) has a melt index of 10 to 25 g/10 min as measured at 220° C. under a load of 10 kg according to ASTM D1238; and
   25 to 50% by weight of a recycled polycarbonate resin (E),
   wherein a weight ratio of the copolymer (B) to the copolymer (C) is 1.5:1 to 2.8:1, and
   wherein a sum of weights of the copolymer (D) and the resin (E) is 50% by weight or more based on a total weight of the thermoplastic resin composition.

2. The thermoplastic resin composition according to claim 1, wherein, when a specimen comprising the thermoplastic resin composition and having a size of 200 mm×12.7 mm×3.2 mm is fixed to a curved jig having a strain of 1.1%, 1 cc of thinner is applied thereto, and then at the time at which cracks occur on a surface of the specimen is measured, the thermoplastic resin composition has a chemical resistance of 600 seconds or more.

3. The thermoplastic resin composition according to claim 2, wherein the graft copolymer (A) has a weight average molecular weight of 650,000 to 1,000,000 g/mol,
   the copolymer (B) comprises 50 to 75% by weight of α-methyl styrene, and 5 to 20% by weight of an aromatic vinyl compound excluding α-methyl styrene, and
   the copolymer (D) has a glass transition temperature of 90 to 100° C.

4. The thermoplastic resin composition according to claim 1, wherein the graft copolymer (A) comprises 50 to 80% by weight of conjugated diene rubber, 5 to 20% by weight of a vinyl cyanide compound, and 10 to 40% by weight of an aromatic vinyl compound.

5. The thermoplastic resin composition according to claim 4, wherein the conjugated diene rubber has an average particle diameter of 2,000 to 5,000 Å.

6. The thermoplastic resin composition according to claim 1, wherein the graft copolymer (A) has a weight average molecular weight of 500,000 to 1,000,000 g/mol.

7. The thermoplastic resin composition according to claim 1, wherein the copolymer (B) comprises 50 to 80% by weight of α-methyl styrene, 10 to 30% by weight of a vinyl cyanide compound, and 5 to 25% by weight of an aromatic vinyl compound excluding α-methyl styrene.

8. The thermoplastic resin composition according to claim 1, wherein the copolymer (C) comprises 20 to 40% by weight of a vinyl cyanide compound and 60 to 80% by weight of an aromatic vinyl compound.

9. The thermoplastic resin composition according to claim 1, wherein the copolymer (D) has a glass transition temperature of 90 to 150° C.

10. The thermoplastic resin composition according to claim 1, wherein the resin (E) comprises one or more selected from the group consisting of a linear polycarbonate resin, a branched polycarbonate resin, and a polyester carbonate copolymer resin.

11. The thermoplastic resin composition according to claim 1, wherein the resin (E) has a melt index of 10 g/10 min or more as measured at 300° C. under a load of 1.2 kg according to ASTM D1238.

12. The thermoplastic resin composition according to claim 1, wherein the resin (E) has an Izod impact strength of 60 kg cm/cm or more as measured under ⅛" thickness conditions according to ASTM D256.

13. The thermoplastic resin composition according to claim 1, wherein the thermoplastic resin composition has a heat deflection temperature of 100° C. or higher as measured according to ASTM D648-7.

14. The thermoplastic resin composition according to claim 1, wherein the thermoplastic resin composition has a melt index of 8.0 g/10 min or more as measured at 220° C. under a load of 10 kg according to ASTM D1238.

15. A molded article, comprising the thermoplastic resin composition according to claim 1.

16. The thermoplastic resin composition according to claim 1, wherein the graft copolymer (A) has a weight average molecular weight of 650,000 to 1,000,000 g/mol.

17. The thermoplastic resin composition according to claim 1, comprising 25 to 30% by weight of a recycled polycarbonate resin (E).

18. The thermoplastic resin composition according to claim 1, wherein the copolymer (B) comprises 50 to 75% by weight of α-methyl styrene, 15 to 25% by weight of a vinyl cyanide compound, and 5 to 20% by weight of an aromatic vinyl compound excluding α-methyl styrene.

19. The thermoplastic resin composition according to claim 1, wherein the copolymer (D) has a glass transition temperature of 80 to 100° C.

20. A method of preparing a thermoplastic resin composition, comprising kneading and extruding 10 to 40% by weight of a vinyl cyanide compound-conjugated diene rubber-aromatic vinyl compound graft copolymer (A), 10 to 40% by weight of an α-methyl styrene-vinyl cyanide compound-aromatic vinyl compound copolymer (B), 5 to 30% by weight of an aromatic vinyl compound-vinyl cyanide compound copolymer (C), 10 to 30% by weight of a recycled vinyl cyanide compound-conjugated diene rubber-aromatic vinyl compound copolymer (D), and 25 to 50% by weight of a recycled polycarbonate resin (E) at 200 to 280° C.,
   wherein the copolymer (D) has a melt index of 10 to 25 g/10 min as measured at 220° C. under a load of 10 kg according to ASTM D1238,
   wherein a weight ratio of the copolymer (B) to the copolymer (C) is 1.5:1 to 2.8:1, and
   wherein a sum of weights of the copolymer (D) and the resin (E) is 50% by weight or more based on a total weight of the thermoplastic resin composition.

* * * * *